(12) United States Patent
Hall et al.

(10) Patent No.: US 8,651,804 B2
(45) Date of Patent: Feb. 18, 2014

(54) VARIABLE GEOMETRY TURBOCHARGER WITH STAND-OFF MEMBERS

(75) Inventors: Richard Dwayne Hall, Nebo, NC (US); Georg Franz Scholz, Woellstein (DE); Patrick Sweetland, Arden, NC (US)

(73) Assignee: BorgWarner Inc, Auburn Hills, MI (US)

( * ) Notice: Subject to any disclaimer, the term of this patent is extended or adjusted under 35 U.S.C. 154(b) by 1075 days.

(21) Appl. No.: 12/668,052

(22) PCT Filed: Jul. 11, 2008

(86) PCT No.: PCT/US2008/069794
§ 371 (c)(1),
(2), (4) Date: Jan. 7, 2010

(87) PCT Pub. No.: WO2009/009735
PCT Pub. Date: Jan. 15, 2009

(65) Prior Publication Data
US 2010/0322757 A1 Dec. 23, 2010

Related U.S. Application Data

(60) Provisional application No. 60/949,068, filed on Jul. 11, 2007.

(51) Int. Cl.
*F04D 29/56* (2006.01)
(52) U.S. Cl.
USPC .......................................... 415/164; 415/160

(58) Field of Classification Search
USPC ........................... 415/159, 160, 163, 164, 165
See application file for complete search history.

(56) References Cited

U.S. PATENT DOCUMENTS

| | | | |
|---|---|---|---|
| 4,770,603 | A | 9/1988 | Engels et al. |
| 6,925,806 | B1 | 8/2005 | Zollinger et al. |
| 2005/0252210 | A1 | 11/2005 | Shiraishi et al. |

FOREIGN PATENT DOCUMENTS

| | | |
|---|---|---|
| DE | 3541508 C1 | 2/1987 |
| JP | 2002038963 A | 2/2002 |
| JP | 2006-514191 A | 4/2006 |

OTHER PUBLICATIONS

English translation of Japanese Office Action dated Jul. 3, 2012.
Supplementary European Search Report dated Mar. 28, 2013.

*Primary Examiner* — Edward Look
*Assistant Examiner* — Maxime Adjagbe
(74) *Attorney, Agent, or Firm* — Miller Canfield (57) ABSTRACT

A turbocharger (1) is provided with one or more movement control members (300) that are connected to the housing (2, 3, 3a) and limit axial movement of the adjustment ring (5). The members (300) can be inserted into one or more holes (400) formed in the housing (2, 3, 3a) and can extend from the holes (400) in a direction towards the adjustment ring (5). The holes (400) can be through-holes, blind-holes or combinations thereof. Various connection structures and methods can be used to affix the members (300) to the housing (2, 3, 3a) including self-locking members, casting, heat welding, friction welding, vibration hammering and staking.

11 Claims, 10 Drawing Sheets

PRIOR ART

Fig. 2

PRIOR ART

VARIABLE GEOMETRY TURBOCHARGER WITH STAND-OFF MEMBERS

FIELD OF THE INVENTION

This invention is directed to a turbocharging system for an internal combustion engine and more particularly to axial travel control for an adjustment ring of the turbocharger.

BACKGROUND OF THE INVENTION

Turbochargers are a type of forced induction system. They deliver compressed air to the engine intake, allowing more fuel to be combusted, thus boosting the engine's horsepower without significantly increasing engine weight. This can allow for the use of a smaller turbocharged engine, replacing a normally aspirated engine of a larger physical size, thus reducing the mass and aerodynamic frontal area of the vehicle. Turbochargers use the exhaust flow from the engine to drive a turbine, which in turn, drives the air compressor. At startup, the turbocharger may be at temperatures well below 0° C. Since the turbine spins at extremely high speed, in the range of 150,000 RPM to 300,000 RPM, is mechanically connected to the exhaust system, it sees high levels of temperature, up to 1050° C. for a gasoline engine, and vibration. Such conditions have a detrimental effect on the components of the turbocharger. Because of these adverse conditions the design, materials and tolerances must be selected to provide adequate life of the assembly for a given market cost. The design selections, required to satisfy these conditions, often lead to corrosion and resultant sticking of the VTG components.

Turbochargers, which utilize some form of turbine flow and pressure control are called by several names and offer control though various means. Some have rotating vanes; some have sliding sections or rings. Some titles for these devices are: variable turbine design (VTG), variable geometry turbine (VGT), variable nozzle turbine (VNT), or simply variable geometry (VG). The subject of this patent is the rotating vane type of variable turbine, which will be referred to as VTG for the remainder of this discussion.

Variable turbine geometry (VTG) turbochargers are known and utilize adjustable guide vanes rotatably connected to a vane ring or nozzle wall to control the amount of exhaust gas flow to the turbine wheel. The VTG turbochargers have a large number of components that must be assembled and positioned in the turbine housing so that the guide vanes are properly positioned with respect to the exhaust supply channel and the turbine wheel. VTG Turbochargers can employ an adjustment ring that actuates movement of the vanes for control of the amount of gas flow.

Exhaust gas is a high temperature corrosive gas. While it is known to make components of corrosion resistant materials such as high Chromium, high Vanadium steels, these materials are poor in machinability and are also expensive, thus unacceptably increase the material and manufacturing costs of a turbocharger turbine housing. Turbocharger turbine housings are most commonly made of cast iron, which is relatively inexpensive and easy to cast mold. However, cast iron is a highly porous material and is very susceptible to corrosion, particularly under conditions of high temperature cycling and exposure to diesel exhaust condensates. The effects of corrosion can spread to components that are in contact with the cast iron housing such as the adjustment ring. The adjustment ring, which requires relatively precise movement in order to actuate the vanes, can be prone to failure based upon corrosion from the turbine housing.

Figure 1:
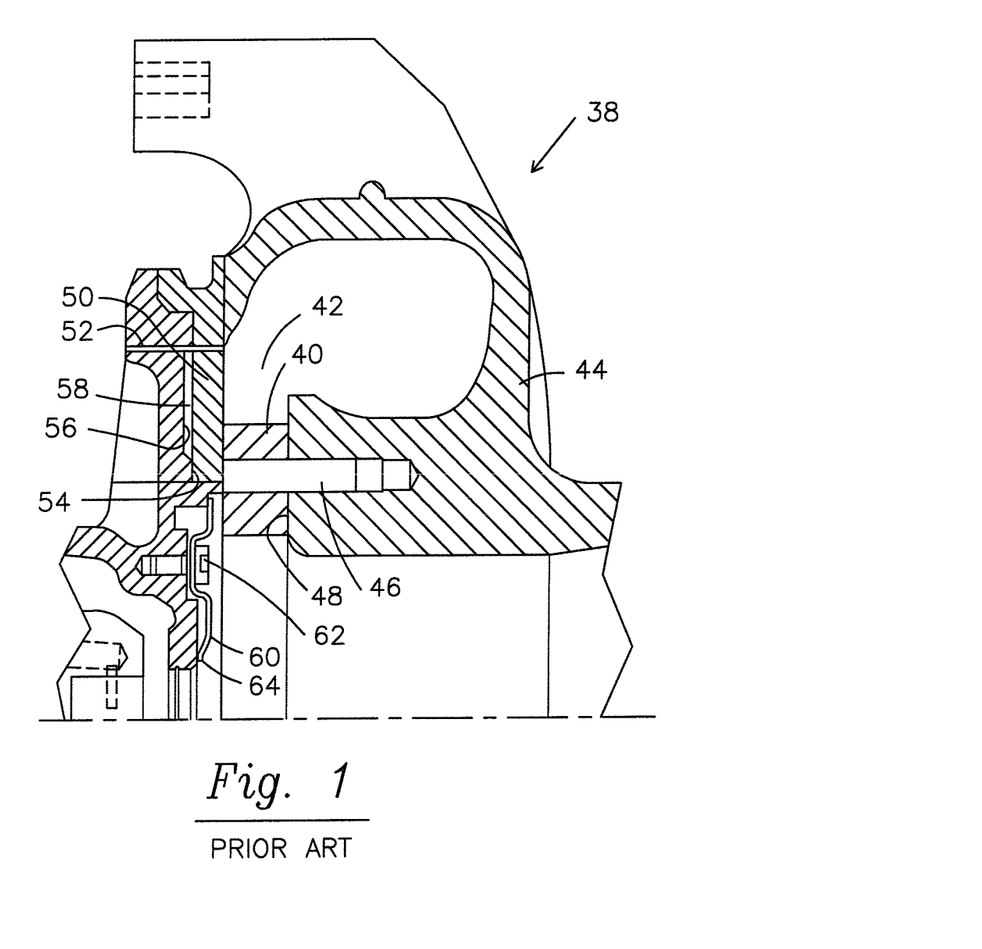
FIG. 1 is a cross-sectional view of a turbine portion of a contemporary turbocharger system as described in U.S. Pat. No. 6,925,806.

In U.S. Pat. No. 6,925,806 to Zollinger, applicants describe a typical adjustment or unison ring configuration as shown in FIG. 1. The variable geometry turbocharger assembly (38) has a plurality of vanes (40) movably disposed within the exhaust flow passage (42) of the turbine housing (44), and a post (46) is used to connect each vane to the nozzle wall (48). An annular unison ring (50) is positioned within the turbine housing (44), and is carried by a shoulder portion (54) of the center housing surface. The unison ring (50) is in direct contact with the center housing.

The center housing surface has a recessed portion (56) that extends radially outwardly a distance from the shoulder (54) and that provides an annular space (58) between an inside surface of the unison ring (50) and the center housing. The recessed portion (56) operates to provide a ventilation path for air to circulate behind the unison ring (50) to help control the unwanted accumulation of moisture therebetween. Moving radially inwardly from the shoulder portion (54), the center housing includes an annular heat shroud (60) that is attached thereto by a number of bolts (62). The heat shroud is a disk-shaped annular construction that is configured to fit over the region of the center housing surface extending roughly between the unison ring and a central shaft opening (64). The heat shroud operates to control the amount of heat transfer from the turbine housing to the central housing.

Figure 1A:
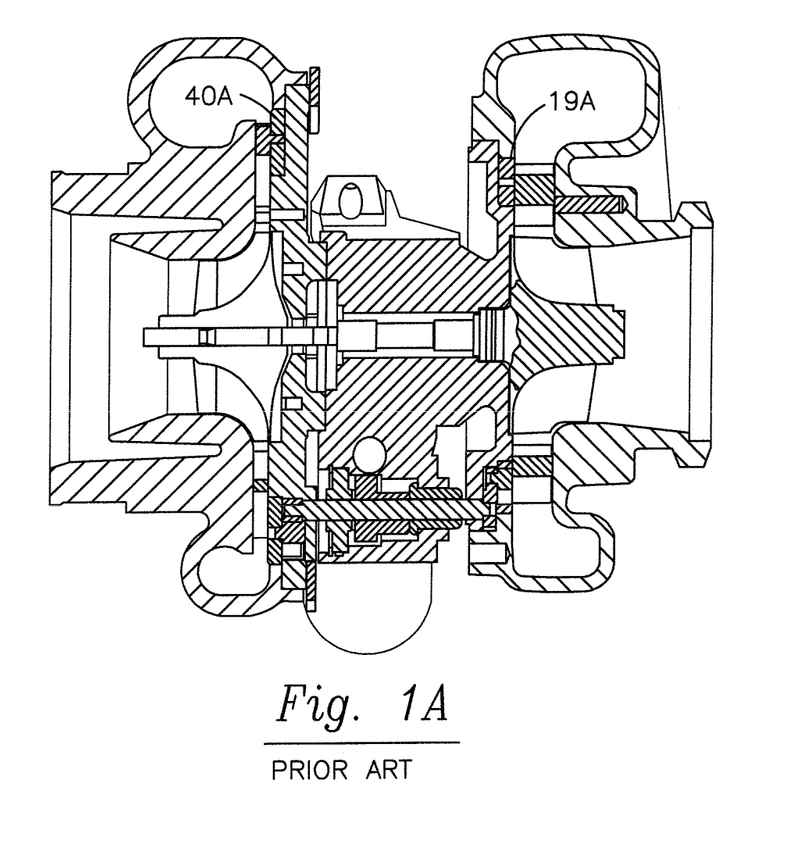
FIG. 1A is a cross-sectional view of a turbine portion of a contemporary turbocharger system as described in U.S. Pat. No. 6,679,057.

The Zollinger applicants correctly point out the drawback of the unison ring (50) being carried by, and in direct contact with, a portion of the center housing surface. The cast iron center housing in combination with moisture build-up between the unison ring (50) and center housing leads to corrosion in this area of the turbocharger. The corrosion can prevent proper unison ring rotational movement, thereby restricting or preventing desired vane operation In U.S. Pat. No. 6,679,057 to Arnold, a turbine adjustment ring (19A) and a compressor adjustment ring (40A) are shown in FIG. 1A for a variable turbine and variable compressor geometry turbocharger. Both of the adjustment rings (19A) and (40A) are directly in contact with the housing where corrosion effects can lead to failure of the rings.

Figure 2:
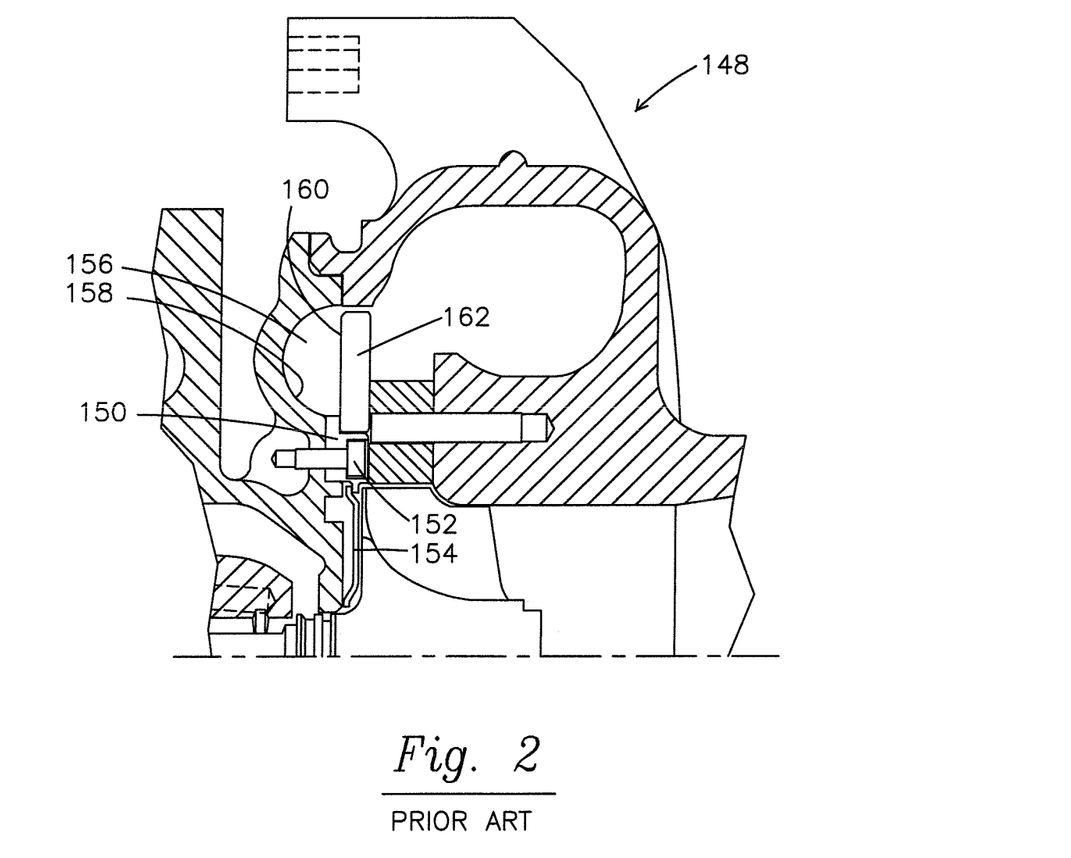
FIG. 2 is a cross-sectional view of a turbine portion of another contemporary turbocharger system according to U.S. Pat. No. 6,925,806.

Referring again to U.S. Pat. No. 6,925,806, the Zollinger applicants attempt to prevent this problem of corrosion effects by providing a ring insert that is held in place by insert fasteners and which can be used to control movement of the unison ring. As shown in FIG. 2, the variable geometry turbocharger assembly (148) includes the unison ring insert (150) with unison ring insert fasteners (152) being used to connect the insert to the center housing surface, and an optional heat shroud (154) being held in place against the center housing by the insert. A recessed portion or annular space (156) between the center housing surface (158) and the inside surface (160) of the unison ring (162) is provided. An enlarged annular space (156) is provided in the form of a semi circular or "C"-shaped channel configured into the center housing surface. The enlarged annular space attempts to provide a further degree of gas circulation and ventilation between the unison ring (150) and the center housing to provide an enhanced amount of control over unwanted moisture accumulation therebetween.

The Zollinger unison ring insert (150) provides more complexity to an already complicated system and adds additional parts, and cost including the insert fasteners (152) and the heat shroud (154), which can be subject to failure in the stressful environment of the turbocharger. Additionally, because of the configuration of the unison ring insert (150) with the insert fasteners (152) and heat shroud (154) and their positioning with respect to the other components of the turbocharger, such as the vanes and vane posts, assembly of the turbocharger is made more difficult and time-consuming.

Thus, there is a need for a system and method for controlling movement of the adjustment or unison ring with respect to the center housing. There is a further need for such a system and method that reduces and/or prevents corrosion effects to the assembly. There is a further need for such a system and method that accounts for thermal growth of the components while maintaining efficiencies. There is a yet a further need for such a system and method that is cost effective and dependable. There is additionally a need for such a system and method that facilitates manufacture, assembly and/or disassembly.

SUMMARY OF THE INVENTION

The exemplary embodiments of the turbocharger provide supplemental means for limiting the axial travel of the adjustment ring. One or more such movement control devices can be used to prevent the adjustment ring from contacting the center housing or other housing of the turbocharger in order to reduce or eliminate corrosion effects around the adjustment ring. The system and method described herein can account for thermal growth of the components while maintaining efficiencies.

BRIEF DESCRIPTION OF THE DRAWINGS

The present invention is illustrated by way of example and not limitation in the accompanying drawings in which like reference numbers indicate similar parts, and in which:

FIG. 11b is an enlarged cross-sectional view of another portion of the movement control device of FIG. 11a;

FIG. 13b is an enlarged plan view of the movement control device of FIG. 13a;

FIG. 17b is an enlarged cross-sectional view of a portion of the movement control device of FIG. 17a.

DETAILED DESCRIPTION OF THE INVENTION

Figure 3:
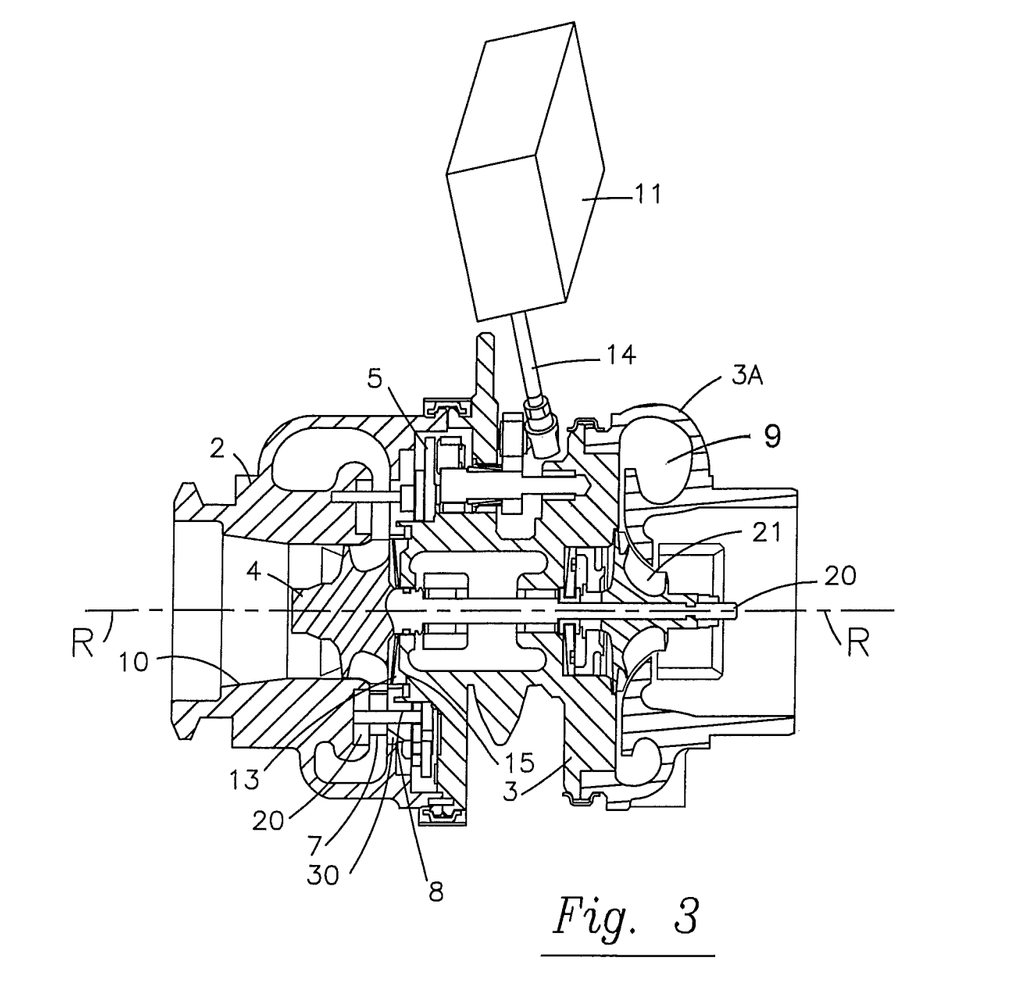
FIG. 3 is a sectional view of an variable geometry turbocharger assembly of the present invention.
Figure 3A:
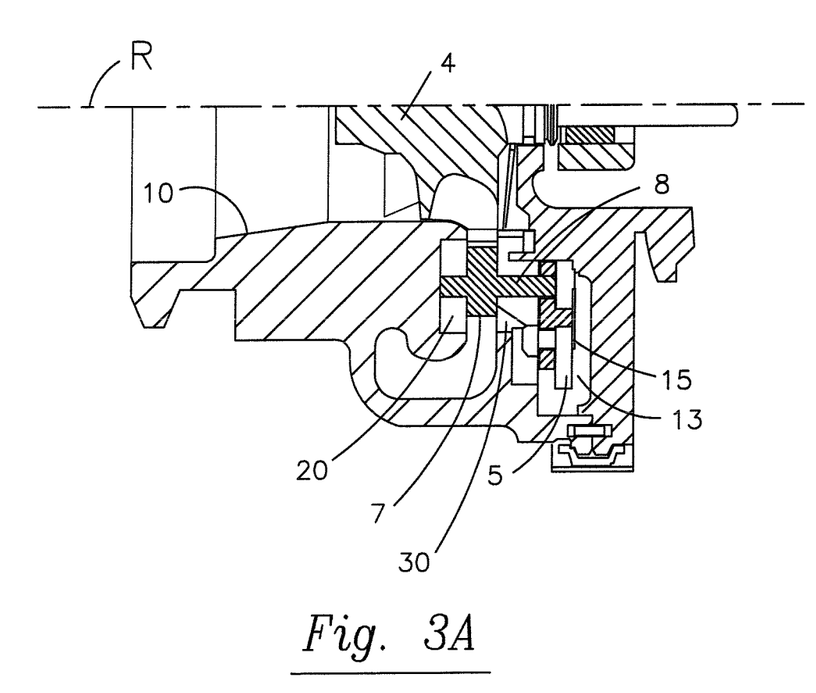
FIG. 3A is a magnified view of a vane zone from FIG. 3

Referring to FIG. 3, a turbocharger (1) has a turbine housing (2), a center housing (3) and a compressor housing (3a) connected to each other and positioned along an axis of rotation R. The turbine housing (2) has an outer guiding grid of guide vanes (7) over the circumference of a vane ring (20), or a pair of vane rings (20,30). The guide vanes (7) may be pivoted by pivoting shafts (8) inserted into bores of the vane ring (20) so that each pair of vanes define nozzles of selectively variable cross-section according to the pivoting position of the vanes (7). This allows for a larger or smaller volume of exhaust gases to be supplied to a turbine rotor (4). The exhaust gases are provided to the guide vanes (7) and rotor (4) by a turbine housing volute (9). The exhaust gases are discharged through an exducer (10), and the rotor (4) drives a compressor impeller (21) fastened to the shaft (20) of the rotor. The present disclosure also contemplates one or more of turbine housing (2), center housing (3) and compressor housing (3a) being integrally formed with each other. FIG. 3A is magnified to show the references in the vicinity of the vanes more clearly.

In order to control the position of the guide vanes (7), an actuation device (11) can be provided, which controls an actuation movement of a pestle member (14) housed therein, whose axial movement is converted into a rotational movement of an adjustment or control ring (5) situated behind the upper vane ring (30). By this rotational movement, the guide vanes (7) may be displaced from a substantially tangential extreme position into a substantially radially extending extreme position, or vice versa. In this way, a larger or smaller amount of exhaust gases from a combustion motor supplied by the turbine housing volute (9) can be fed to the turbine rotor (4), and discharged through the exducer (10). Between the upper vane ring (30) and the contour (15) in the turbine housing (2), there can be a relatively small space (13) to permit free movement of air around the control ring (5). The shape and dimensions of this space (13) can be chosen to increase the efficiency of the turbocharger (1), while allowing for thermal expansion due to the hot exhaust gases. Since this space is fluidly connected to the nozzle zone, which is the zone wetted by the exhaust gas flow, and defined by the volumes between the guide vanes and the upper and lower vane rings. To ensure the width of the air space (13) and the distance of the vane support ring (6) from the turbine housing contour surface (15), the vane support ring (30) can have spacers (16) formed thereon.

Referring additionally to FIGS. 4 through 8, the axial position or travel of the adjustment ring (5) with respect to the center housing (3), can be controlled by one or more movement control devices (300). The movement control devices (300) provide separation between the center housing (3) and the adjustment ring (5) to prevent corrosion. The axial position or axial travel of the adjustment ring (5) with respect to the vane rings (20,30), can be controlled by vane levers (350) (e.g., fork levers) or other drive linkages that operably connect the adjustment ring to the vanes (7). However, the present disclosure also contemplates the use of other structures or techniques for controlling the axial movement of the adjustment ring (5) with respect to the vane support ring (6). Such other structures or techniques can prevent the adjustment ring (5) from contacting the turbine housing (2).

In an exemplary embodiment, movement control devices (300) can be any number of stand-off members or pins that are connected to one or both of the center housing (3) and the adjustment ring (5). For example, the stand-off members (300) can extend axially from the center housing (3) in the direction towards the adjustment ring (5). In another example, the stand-off members (300) can extend axially from the adjustment ring (5) in the direction towards the center housing (3). In yet, another example, one or more (e.g., a first group) of the stand-off members (300) can extend axially from the center housing (3) in the direction towards the adjustment ring (5) and one or more (e.g., a second group) of the stand-off members (300) can extend axially from the adjustment ring (5) in the direction towards the center housing (3). The stand-off members (300) can be of a length which selectively defines a space (310) between the stand-off members and the adjustment ring (5). The space (310) gives clearance to facilitate the rotational movement of the adjustment ring (5) for control of the positioning of the guide vanes (7), while providing an abutment surface (305) for limiting axial movement of the ring and preventing contact of the ring with the center housing (3). The length of the stand-off members (300) and the resulting space (310) can be chosen to account for axial thermal expansion of the stand-off members, as well as the other turbocharger components. The choice of material for the stand-off members (300) can be based on several factors, including thermal coefficient of expansion, machineability, cost, strength and durability.

Figure 4:
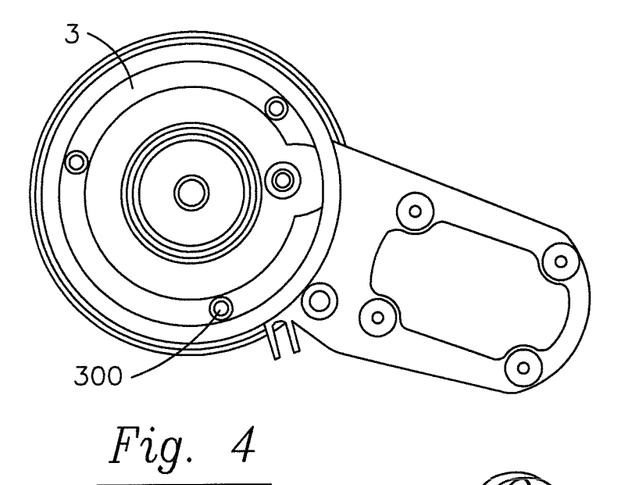
FIG. 4 is a plan view of a portion of the center housing of FIG. 3 showing the position of the stand-off and the actuator mounting.
Figure 5:
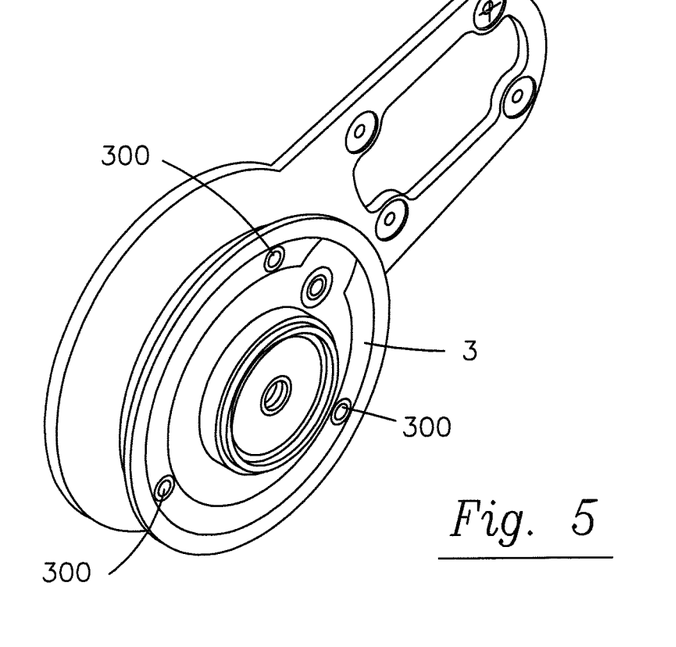
FIG. 5 is a perspective view of the portion of the center housing assembly of FIG. 3.
Figure 6:
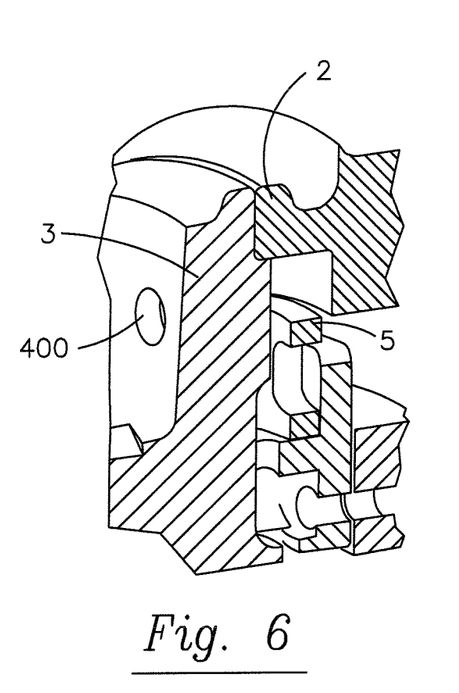
FIG. 6 is a perspective view of a portion of the turbocharger assembly of FIG. 3 without the movement control device.
Figure 7:
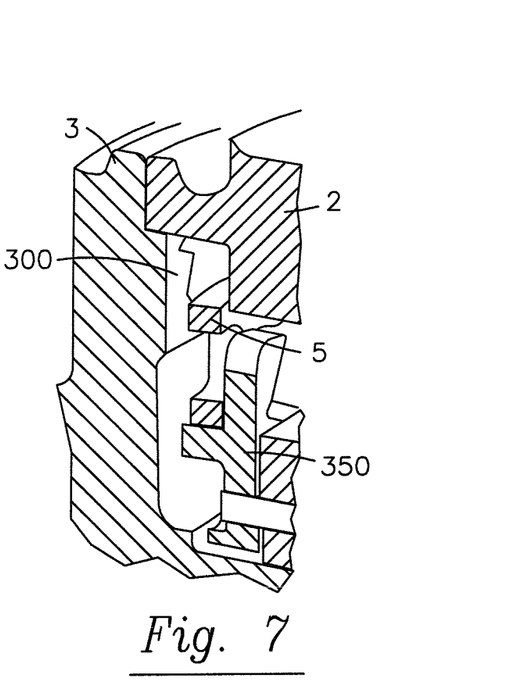
FIG. 7 is a perspective view of the portion of the turbocharger assembly of FIG. 3 with the movement control device.
Figure 8:
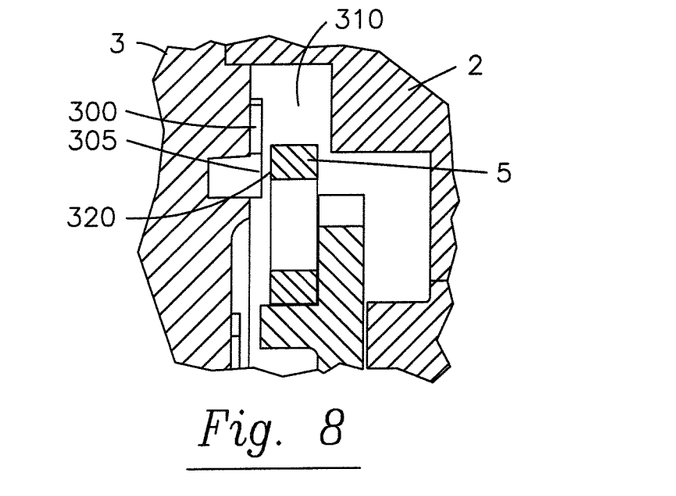
FIG. 8 is a sectional view of the portion of the turbocharger assembly of FIG. 7.

Stand-off members (300) can be a plurality of stand-off members that are positioned in proximity to the periphery of the center housing (3) as shown more clearly in FIG. 4. However, the present disclosure contemplates the stand-off members (300) being positioned at other distances from the longitudinal axis of the center housing (3). The stand-off members (300) can be equidistantly spaced about, or near to, a circumference of the center housing (3). While the exemplary embodiment of FIGS. 3 through 8 has three stand-off members (300) to limit the axial movement of adjustment ring (5), the present disclosure contemplates other numbers of stand-off members being used. The particular number, position and configuration of the stand-off members (300) that are connected to center housing (3) can be varied depending upon a number of factors including alignment with an abutment surface (320) on the adjustment ring (5). Preferably, the abutment surface (320) allows rotational movement of the adjustment ring (5) even when the ring is abutting against, or in close proximity to, the stand-off members (300). The abutment surfaces (305) and (320) can be smooth to facilitate rotational movement of the adjustment ring (5). The space (310) allows for selective abutment of the members (300) and the adjustment ring (5).

As shown more clearly in FIG. (6), a hole (400) is provided in center housing (3) for connection of each of the stand-off members (300). In the exemplary embodiment of FIGS. 3 through 8, each of the holes (400) are formed completely through the center housing (3). By forming holes (400) as through-holes, the manufacture and assembly of the movement control system described herein can be facilitated. For example, the stand-off members (300) can be inserted from an outside surface of the center housing (3) into the hole (400) after assembly of the turbocharger. Additionally, the use of through-holes for holes (400) allows for retro-fitting of the movement control devices, e.g., stand-off members (300), into already assembled turbochargers. For example, the center housing (3) can be machined from the outside to form the holes (400) and then the stand-off members (300) can be inserted through the holes and into the axial limiting position near the adjustment ring (5), without the need for disassembly of the turbocharger. The particular number, position, and configuration of the holes (400) that are formed in center housing (3) can be varied depending upon a number of factors including ease of manufacture, strength of connection with the stand-off members (300) and/or aligning the stand-off members with the abutment surfaces (320) on the adjustment ring (5). Hole (400) is shown as a circular hole (400) but the present disclosure contemplates other shapes and combinations of shapes for the holes that may or may not correspond to the shape of the movement control members (300). For example in order to generate a press-fit, the shape of the zone of the stand-off members (300) may be deformed, when compared to the shape of the hole (400).

The present disclosure also contemplates the use of blind holes for holes (400). Blind holes can be machined or otherwise formed on the inner surface of the center housing (3) and the stand-off members (300) or other movement control devices can be inserted therein, followed by assembly of the remaining components of the turbocharger. The use of blind holes for holes may facilitate sealing of the turbocharger. Similar to the through-holes described above, the blind holes (400) can have varying numbers, positions, shapes and configurations depending upon a number of factors including ease of manufacture, strength of connection with the stand-off members (300) and/or aligning the stand-off members with the abutment surfaces (320) on the adjustment ring (5). The present disclosure also contemplates the use of a combination of through-holes and blind-holes for holes (400).

The stand-off members (300) can be self-locking structures that can be inserted into holes (400) and securely connected therein. The stand-off members (300) can be connected to the center housing (3) through various processes or materials, including welding, for example, heat or friction welding. A combination of self-locking structures on the stand-off members (300) and a secondary process or other connecting material can also be used for securely connecting the members to the center housing (3).

Figure 9:
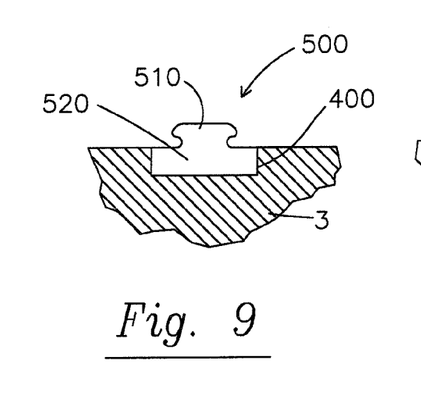
FIG. 9 is a partial cross-sectional view of an exemplary embodiment of a movement control device of the invention.

Referring to FIG. 9, the movement control device (300) can be a stand-off member (500), which is shown positioned in a blind-hole (400) of the center housing (3). The stand-off member (500) has a head (510) of reduced size that extends from the hole (400) and can abut the adjustment ring (5) to limit the axial travel of the ring. The member (500) can be connected to hole (400) by various methods including a press-fit and/or welding. The enlarged root (520) of the member (500) provides strength and rigidity for the connection to the center housing (3), while the reduced head (510) reduces friction, facilitates assembly and allows for movement of other components.

Figure 10:
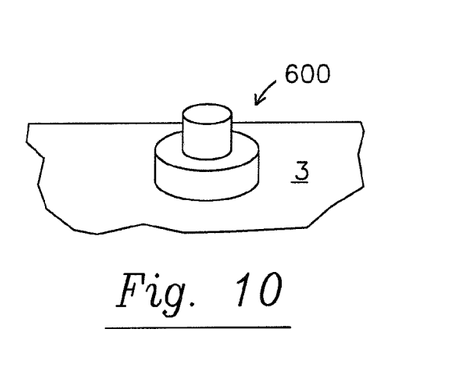
FIG. 10 is a perspective partial cross-sectional view of another exemplary embodiment of a movement control device of the invention.

Referring to FIG. 10, the movement control device (300) can be a stand-off member (600), which is shown extending from center housing (3). The stand-off member (600) can abut the adjustment ring (5) to limit the axial travel of the ring. The member (600) is preferably cast into the center housing (3). By casting the member (600) with the center housing (3), the problem of thermal expansion resulting in disconnection of the member from the center housing can be eliminated. Additionally, the potential failure of connecting structures and/or connection techniques can also be eliminated. The only additional cost for the embodiment of casting the standoff (600) into the large casting being the machining of the top of the nub.

Figure 11A:
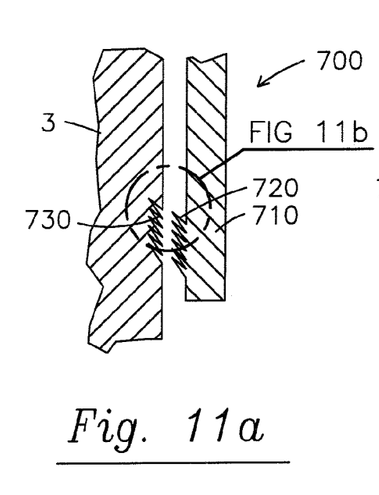
FIG. 11a is a cross-sectional view of a portion of another exemplary embodiment of a movement control device of the invention.
Figure 11B:
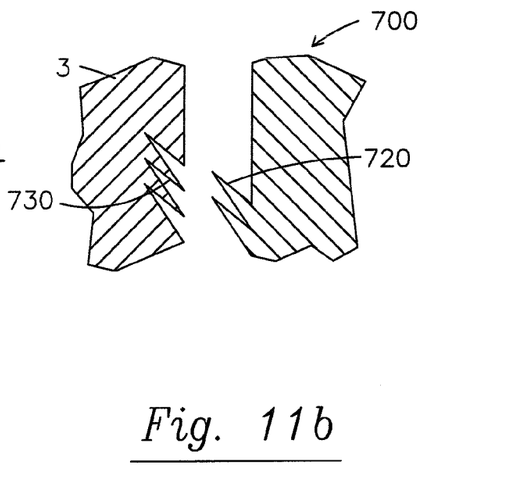

Referring to FIGS. 11a and 11b, the movement control device (300) can be a stand-off member (700), which is shown positioned in a blind-hole (400) of center housing (3) and can abut the adjustment ring (5) to limit the axial travel of the ring. The stand-off member (700) has a self-locking end (710) with one or more barbs or lugs (720) that correspond with engagement structures (730) formed in hole (400). The lugs, or barbs (720) allow for insertion of the member (700) into the hole (400) and prevent removal without the application of a large or pre-determined amount of force. The size, shape and/or configuration of the barbs or lugs (720) can be chosen based upon various factors including the desired strength of the connection and the ease of assembly.

Figure 12:
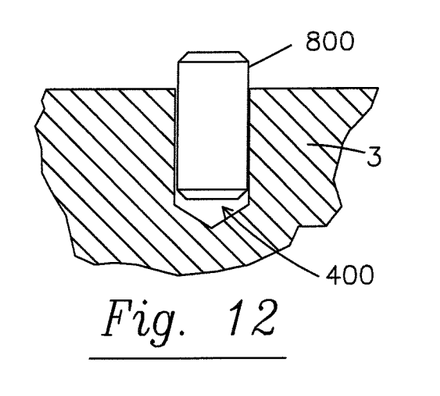
FIG. 12 is a cross-sectional view of another exemplary embodiment of a movement control device of the invention.

Referring to FIG. 12, the movement control device (300) can be a stand-off member (800), which is shown positioned in a blind-hole (400) of center housing (3). The stand-off member (800) has a substantially uniform cylindrical shape and can abut the adjustment ring (5) to limit the axial travel of the ring. The member (800) can be connected to hole (400) by press-fitting.

Figure 13A:
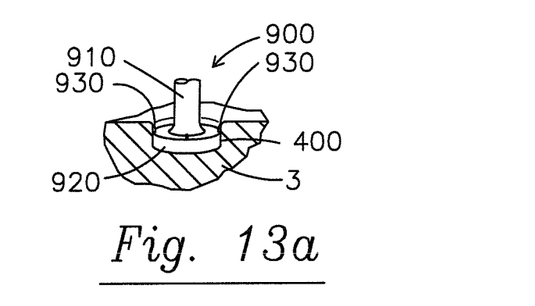
FIG. 13a is a perspective, part cross-sectional view of another exemplary embodiment of a movement control device of the invention.
Figure 13B:
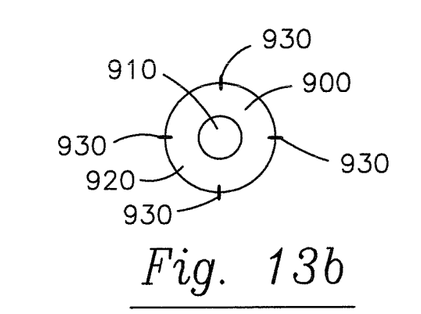

Referring to FIGS. 13a and 13b, the movement control device (300) can be a stand-off member (900), which is shown positioned in a blind-hole (400) of center housing (3). The stand-off member (900) has a head (910) of reduced size that extends from the hole 400 and can abut the adjustment ring 5 to limit the axial travel of the ring. The member (900) can be connected to hole (400) by a staking process where one or more portions of the center housing (3) are deformed to form holding stakes (930). The stakes (930) can be spaced apart around the enlarged root (920) of the member (900) or can be a continuous stake circumscribing the hole (400). The use of an enlarged root (920) provides strength and rigidity for the connection to the center housing (3), while the reduced head (910) facilitates reduction of friction with the adjustment ring and assembly, especially in an environment within the turbocharger where space is at a premium. The reduced head facilitates the staking operation as the press tools forming the stake (930), have to overlap the enlarged root (920). The staking process can use various tools and techniques including high-force staking and/or temperature staking.

Figure 14:
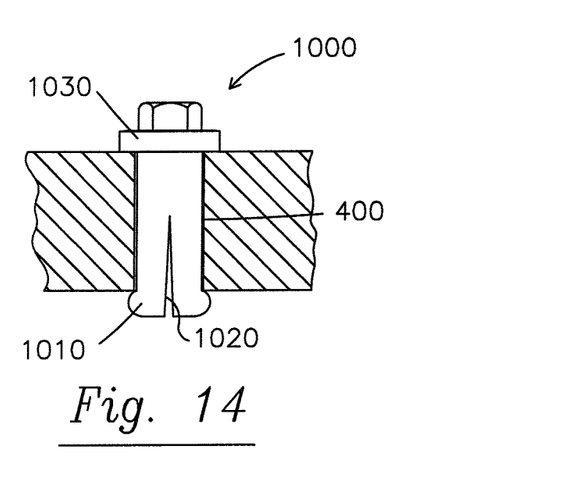
FIG. 14 is a cross-sectional view of another exemplary embodiment of a movement control device of the invention.

Referring to FIG. 14, the movement control device (300) can be a stand-off member (1000), which is shown positioned in a through-hole (400). The stand-off member (1000) has an expandable distal end (1010) with a slot (1020) formed therethrough. The slot (1020) allows for temporary compression of the distal end (1010) so that the member (1000) can be inserted through hole (400). As the distal end (1010) passes through the hole (400), it expands and locks the member (1000) in position in the hole. The opposite end of the member (1000) can have a head or other retaining mechanism (1030) that abuts against the outside of the center housing (3) and prevents the member from completely passing through the hole (400). Member (1000) facilitates assembly of the movement control devices since they can be inserted into each of the holes (400) of the center housing (3) after assembly of the turbocharger. By reversing the assembly procedure for inserting the stand-off member (1000) into the hole (400) the stand-off member may be removed, or re-set.

Figure 15:
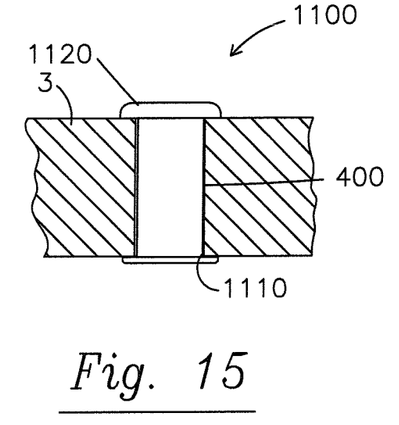
FIG. 15 is a cross-sectional view of another exemplary embodiment of a movement control device of the invention.

Referring to FIG. 15, the movement control device (300) can be a stand-off member (1100), which is shown positioned in a through-hole (400). The stand-off member (1100) is a rivet having a distal end (1110) that can be deformed, for example with an orbital riveter, so as to expand and lock the member in the hole (400). The deformation of the distal end (1110) of the orbital rivet (1100) can be by a vibration hammering technique. The opposite end of the member (1100) can have a head or other retaining mechanism (1120) that abuts against the outside of the center housing (3) and prevents the member from completely passing through the hole (400).

Figure 15A:
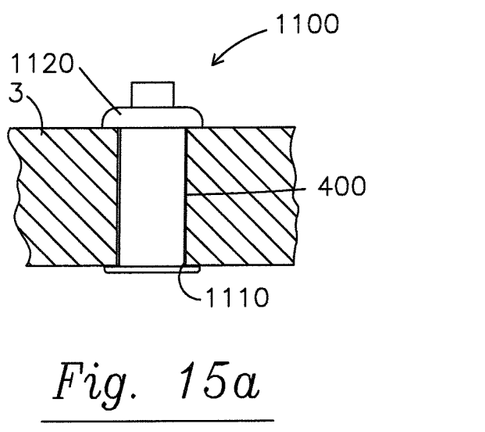
FIG. 15A is a cross-sectional view of a variation of the embodiment of FIG. 15.

Referring to FIG. 15, the movement control device (300) can be a stand-off member (1100), which is shown positioned in a through-hole (400). The stand-off member (1100) is a rivet having a ledge between the shank (400) and the nose (1100). The ledge can be deformed, for example with an orbital riveter, so as to expand and lock the member in the hole (400). The deformation of the ledge of the rivet (1100) can be by a vibration hammering technique. The opposite end of the member (1100) can have a head or other retaining mechanism (1120) that abuts against the outside of the center housing (3) and prevents the member from completely passing through the hole (400).

Figure 16:
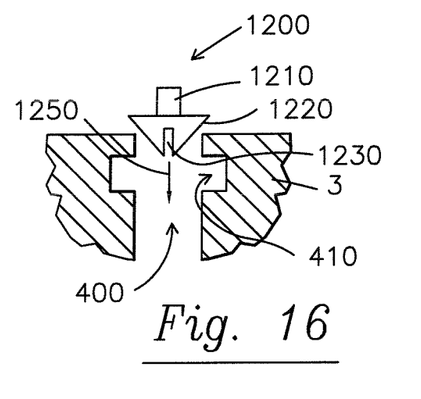
FIG. 16 is a cross-sectional view of another exemplary embodiment of a movement control device of the invention.

Referring to FIG. 16, the movement control device (300) can be a stand-off member (1200), which is shown being inserted into a hole (400) of center housing (3) as shown by arrow (1250). The stand-off member (1200) has an abutment head (1210) and an expandable distal end (1220) with a slot (1230) formed therethrough. The slot (1230) allows for temporary compression of the distal end (1220) so that the member (1200) can be inserted into hole (400). As the distal end (1220) is inserted into the hole (400), it reaches the annular slot (410) and expands to lock the member (1200) in position in the hole. The abutment head (1210) is of reduced size and extends from the hole (400) to abut the adjustment ring (5) and limit axial travel of the ring.

Figure 17A:
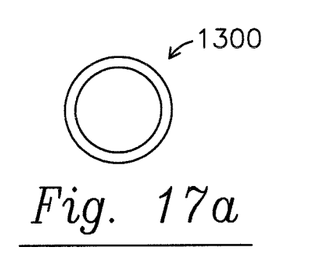
FIG. 17a is a plan view of another exemplary embodiment of a movement control device of the invention.
Figure 17B:
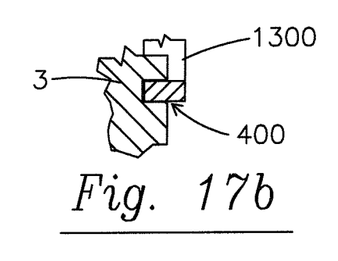

Referring to FIGS. 17a and 17b, the movement control device (300) can be a stand-off member (1300), which is shown positioned in an annular cavity (400). The stand-off member (1300) is a snap ring that can be expanded for insertion into the annular cavity (400). When the snap ring (1300) returns to its unbiased state, it is securely retained in the annular cavity (400). The snap ring (1300) extends from the annular cavity (400) in a direction towards the adjustment ring (5) to limit axial travel of the ring. Various tools can be used for expansion of the snap ring (1300) during the insertion process. The present disclosure also contemplates the snap ring (1300) being larger than the annular cavity (400) so that it is compressed when inserting into the cavity.

Figure 18:
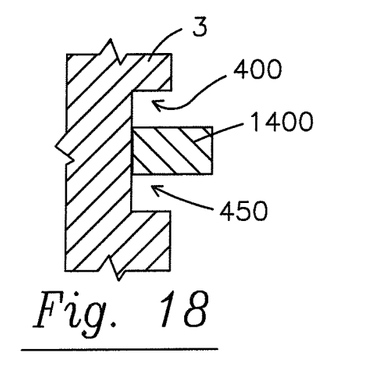
FIG. 18 is a cross-sectional view of another exemplary embodiment of a movement control device of the invention.

Referring to FIG. 18, the movement control device (300) can be a stand-off member (1400), which is shown positioned in a blind-hole (400) of center housing (3). The stand-off member (1400) is of a reduced diameter as compared to the hole (400). A friction welding process can be utilized to connect the member (1400) into the hole (400). The spaces (450) on either side of the member (1400) due to the difference in size between the member and the hole (400) provide enough surface area and movement area for achieving the friction weld.

Various other shapes, sizes and configurations can be used for the movement control device (300) to limit the axial travel of the adjustment ring (5). The exemplary embodiments above have been described with respect to an adjustment ring that adjusts vane position to control exhaust gas flow to the turbine rotor. However, it should be understood that the present disclosure contemplates limiting axial travel of other adjustment rings of a turbocharger, including an adjustment ring that adjusts vane position with respect to a compressor rotor to control flow of a compressible fluid to the compressor rotor. The present disclosure further contemplates the use of movement control members (300) for limiting axial travel of adjustment rings in a turbocharger having both variable turbine geometry and variable compressor geometry. Such an arrangement for a variable compressor geometry can have many of the components described above for the variable turbine geometry, as well as other components known in the art.

While the invention has been described by reference to a specific embodiment chosen for purposes of illustration, it should be apparent that numerous modifications could be made thereto by those skilled in the art without departing from the spirit and scope of the invention.

We claim:

1. A turbocharger (1) comprising:
a turbine housing (2), a compressor housing (3a) and a center housing (3);
a turbine rotor (4) rotatably mounted in the turbine housing (2);
at least one first supply channel (9) for supplying an exhaust gas to rotate the turbine rotor (4);
a compressor rotor (21) rotatably mounted in the compressor housing (3a);
at least one second supply channel for supplying a compressible fluid to the compressor rotor (21);
a shaft (20) rotatably mounted in the center housing (3) and connected to the compressor rotor (21) and turbine rotor (4) for driving the compressor rotor (21);
a plurality of vanes (7) distributed in an annular vane space (13) and being movable to control flow of at least one of the exhaust gas or the compressible fluid;
an adjustment ring (5) operably connected to each of the plurality of vanes (7) and being rotatable to move the plurality of vanes (7); and
at least one axial movement control pin (300) extending axially from the adjustment ring (5) in the direction of the center housing, or from the center housing in the direction of the unison ring, and dimensioned to prevent the adjustment ring (5) from directly contacting the center housing (3).

2. The turbocharger of claim 1, wherein at least one receptacle (400) is formed in the center housing (3), and wherein said at least one axial movement control pin (300) is partially inserted in the at least one receptacle (400).

3. The turbocharger of claim 2, wherein the at least one receptacle (400) is a through-hole.

4. The turbocharger of claim 2, wherein the at least one receptacle (400) is a blind-hole.

5. The turbocharger of claim 2, wherein the at least one movement control pin (300) is a self-locking member.

6. The turbocharger of claim 2, wherein the at least one movement control pin (300) is a plurality of movement control pins (300), wherein the at least one receptacle (400) is a plurality of receptacles (400), and wherein each of the plurality of movement control pins (300) extends out of one of the plurality of receptacles (400).

7. The turbocharger of claim 6, wherein the plurality of movement control pins (300) are equidistantly spaced about a longitudinal axis of the housing (2, 3, 3a).

8. The turbocharger of claim 2, wherein the at least one movement control pin (300) is at least partially connected to the housing (2, 3, 3a) by a connection process chosen from the group consisting essentially of heat welding, friction welding, vibration hammering, staking or any combinations thereof.

9. The turbocharger of claim 1, wherein the at least one movement control pin (300) is cast into the housing (2, 3, 3a).

10. The turbocharger of claim 1, wherein the at least one movement control pin (300) has a distal end (510, 910, 1210) of reduced diameter and in proximity to the adjustment ring (5).

11. A turbocharger (1) comprising:
a turbine housing (2), a compressor housing (3a) and a center housing (3);
a turbine rotor (4) rotatably mounted in the turbine housing (2);
at least one first supply channel (9) for supplying an exhaust gas to rotate the turbine rotor (4);
a compressor rotor (21) rotatably mounted in the compressor housing (3a);
at least one second supply channel for supplying a compressible fluid to the compressor rotor (21);
a shaft (20) rotatably mounted in the center housing (3) and connected to the compressor rotor (21) and turbine rotor (4) for driving the compressor rotor (21);
a plurality of vanes (7) distributed in an annular vane space (13) and being movable to control flow of at least one of the exhaust gas or the compressible fluid;
a generally ring-shaped adjustment ring (5) operably connected to each of the plurality of vanes (7) and being rotatable to move the plurality of vanes (7); and
at least one axial movement control pin (300) extending axially from the adjustment ring (5) and dimensioned to prevent the adjustment ring (5) from directly contacting the center housing (3).

* * * * *